(12) United States Patent
Matsukubo et al.

(10) Patent No.: US 7,382,484 B2
(45) Date of Patent: Jun. 3, 2008

(54) INFORMATION PROCESSING APPARATUS AND ITS CONTROL METHOD

(75) Inventors: Yushi Matsukubo, Kanagawa-ken (JP); Yukihiko Shimizu, Chiba-ken (JP); Masataka Yasuda, Kanagawa-ken (JP); Noriyuki Kobayashi, Kanagawa-ken (JP); Shinichiro Maekawa, Kanagawa-ken (JP); Takeshi Namikata, Kanagawa-ken (JP); Hideki Sakai, Chiba-ken (JP); Hirohiko Tashiro, Kanagawa-ken (JP); Atsushi Matsumoto, Tokyo (JP); Masamichi Akashi, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 607 days.

(21) Appl. No.: 11/148,298

(22) Filed: Jun. 9, 2005

(65) Prior Publication Data
US 2005/0275884 A1 Dec. 15, 2005

(30) Foreign Application Priority Data
Jun. 9, 2004 (JP) ............................. 2004-171762

(51) Int. Cl.
*G06F 15/00* (2006.01)
(52) U.S. Cl. .................. 358/1.15; 358/1.13; 710/15
(58) Field of Classification Search .............. 358/1.13, 358/1.14, 1.15, 2.1, 3.24; 399/1, 8; 709/201, 709/203; 710/8, 15–17, 20
See application file for complete search history.

(56) References Cited

U.S. PATENT DOCUMENTS

| | | | | |
|---|---|---|---|---|
| 5,287,194 A | * | 2/1994 | Lobiondo | ............... 358/1.15 |
| 6,058,277 A | * | 5/2000 | Streefkerk et al. | ......... 399/81 |
| 6,970,261 B1 | * | 11/2005 | Robles | ................ 358/1.15 |
| 7,061,635 B1 | * | 6/2006 | Wanda et al. | ............. 358/1.15 |
| 7,281,064 B2 | * | 10/2007 | Wanda | .................... 710/19 |
| 2002/0101604 A1 | * | 8/2002 | Mima et al. | .............. 358/1.15 |
| 2003/0159114 A1 | * | 8/2003 | Nishikawa et al. | ......... 715/530 |
| 2003/0184799 A1 | * | 10/2003 | Ferlitsch | ................ 358/1.15 |

(Continued)

FOREIGN PATENT DOCUMENTS

JP 9-204277 8/1997

(Continued)

OTHER PUBLICATIONS

U.S. Appl. No. 11/197,511, filed Aug. 5, 2005.

(Continued)

*Primary Examiner*—Kimberly A Williams
(74) *Attorney, Agent, or Firm*—Fitzpatrick, Cella, Harper & Scinto

(57) ABSTRACT

When the distributed load system of grid computing is applied to printers, multi-functional peripheral equipments, and the like connected to a computer network, if a device which inputs a job received from the client is executing processing, the distributed processing requires much time, and the user of the client cannot obtain the print result soon. Hence, when a print job is input, the processing time upon executing distributed processing of data processes in the print job by computer devices connected to the computer network is estimated. Based on the estimation result, the print job or jobs divided from the print job are transmitted to the computer devices connected to the computer network.

11 Claims, 9 Drawing Sheets

U.S. PATENT DOCUMENTS

| | | | |
|---|---|---|---|
| 2003/0222396 A1* | 12/2003 | Kurahashi et al. | 271/207 |
| 2004/0190042 A1* | 9/2004 | Ferlitsch et al. | 358/1.15 |
| 2004/0196496 A1* | 10/2004 | Klassen | 358/1.15 |
| 2004/0196498 A1* | 10/2004 | Klassen | 358/1.15 |
| 2004/0233472 A1* | 11/2004 | Gassho et al. | 358/1.15 |
| 2005/0117176 A1* | 6/2005 | Benz et al. | 358/1.15 |
| 2005/0243365 A1* | 11/2005 | Noda | 358/1.15 |
| 2005/0270566 A1* | 12/2005 | Tanaka | 358/1.15 |
| 2005/0280861 A1* | 12/2005 | Shima et al. | 358/1.15 |
| 2006/0126115 A1* | 6/2006 | Morikawa et al. | 358/1.15 |
| 2006/0244991 A1* | 11/2006 | Tenger et al. | 358/1.15 |
| 2006/0290979 A1* | 12/2006 | Sumio | 358/1.15 |
| 2007/0046987 A1* | 3/2007 | Shima | 358/1.15 |
| 2007/0092323 A1* | 4/2007 | Lin et al. | 400/61 |
| 2007/0177180 A1* | 8/2007 | Yamada et al. | 358/1.13 |

FOREIGN PATENT DOCUMENTS

| | | |
|---|---|---|
| JP | 9-218861 | 8/1997 |
| JP | 10-40040 | 2/1998 |
| JP | 2003-196058 | 7/2003 |

OTHER PUBLICATIONS

U.S. Appl. No. 11/148,286, filed Jun. 9, 2005.
U.S. Appl. No. 11/148,268, filed Jun. 9, 2005.
U.S. Appl. No. 11/148,269, filed Jun. 9, 2005.
U.S. Appl. No. 11/148,257, filed Jun. 9, 2005.
U.S. Appl. No. 11/148,264, filed Jun. 9, 2005.

* cited by examiner

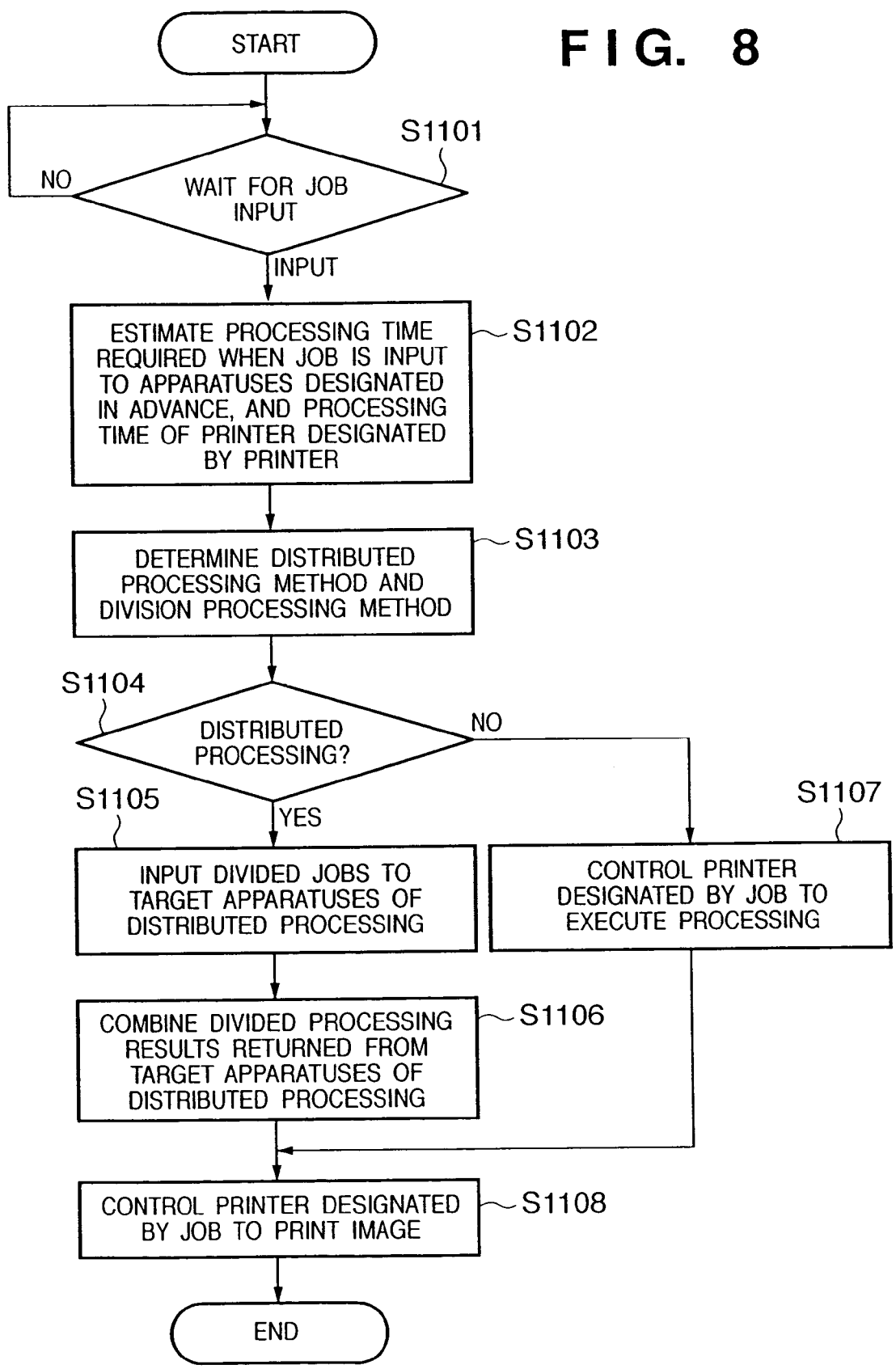

FIG. 9A

| APPARATUS | WHOLE INPUT | PAGE DIVISION (EQUAL) | PAGE DIVISION (UNEQUAL) |
|---|---|---|---|
| A | 1 | — | — |
| B | 0.5 | 0.2 | 0.3 |
| C | 0.7 | 0.3 | 0.3 |
| D | 1.2 | 0.5 | 0.3 |
|   | — | 0.5 | 0.3 |

FIG. 9B

| APPARATUS | WHOLE INPUT | PAGE DIVISION (EQUAL) | PAGE DIVISION (UNEQUAL) |
|---|---|---|---|
| A | 1 | — | — |
| B(LOAD LARGE) | 1.5 | 0.6 | 0.8 |
| C | 0.7 | 0.3 | 0.3 |
| D | 1.2 | 0.5 | 0.3 |
|   | — | 0.6 | 0.8 |

FIG. 9C

| APPARATUS | WHOLE INPUT | PAGE DIVISION (EQUAL) | PAGE DIVISION (UNEQUAL) |
|---|---|---|---|
| A | 1 | — | — |
| B(LOAD LARGE) | 1.5 | 0.6 | 0.8 |
| C(LOAD LARGE) | 3.1 | 1.1 | 1.1 |
| D | 1.2 | 0.5 | 0.3 |
|   | — | 1.1 | 1.1 |

INFORMATION PROCESSING APPARATUS AND ITS CONTROL METHOD

FIELD OF THE INVENTION

The present invention relates to an information processing apparatus and its control method and, more particularly, to flexible distributed processing according to the situation of the system.

BACKGROUND OF THE INVENTION

A plurality of proposals have been made about a clustering mechanism that allows high-speed printing by distributing output destinations upon printing a large number of pages or copies. A device (printer, multi-functional peripheral equipments, or the like) on the network distributes its processes to other network-connected devices to execute distributed processing, thus rapidly completing the processes.

The distributed processing based on the clustering mechanism divides pages or copies to be printed and makes a plurality of devices execute processes up to printing of the divided pages or copies, and a device designated by a client does not print all pages or copies. Therefore, such processing is suited to parallelly print a large quantity of printed matters. However, upon executing a finishing process such as page sorting or the like, printed matters separately output by a plurality of devices must be collected using arbitrary means, and must then be processed and finished.

As distributed processing associated with printing, Japanese Patent Application Laid-open No. 9-204277 discloses a technique which improves the processing speed of the entire system by efficiently collecting print data rasterized by a plurality of devices on the network. Also, Japanese Patent Application Laid-open No. 9-218861 discloses a technique which shortens an idle time (i.e., the control waits for another job while holding intermediate data of processing) upon scheduling parallel processing of printer description language (PDL) data.

When the distributed load system of grid computing is applied to computer devices such as printers, multi-functional peripheral equipment, and the like connected to a computer network, if a device that inputs a job which is received from a client and includes a large number of pages or requires a long processing time is executing another job (e.g., a print job received from a host computer), the distributed processing requires much time, and the client user cannot obtain the print result soon.

SUMMARY OF THE INVENTION

According to the first aspect of the present invention, there is disclosed an information processing apparatus connected to a network, which receives a print job, estimates the processing time upon executing distributed processing of data processes in the print job by information processing devices connected to the network, and transmits the print job or jobs divided from the print job to the information processing devices connected to the network on the basis of the estimation result.

According to the aforementioned apparatus and processing, the convenience can be enhanced compared to clustering, and distributed processing can be flexibly executed according to the situation of the system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a flowchart showing the processing of a TM; and

FIGS. 9A to 9C are tables for explaining determination of the distributed processing method and division processing method (step S1103).

DESCRIPTION OF THE PREFERRED EMBODIMENTS

Preferred embodiments of the present invention will be described in detail hereinafter with reference to the accompanying drawings.

[Grid Computing]

Figure 1:
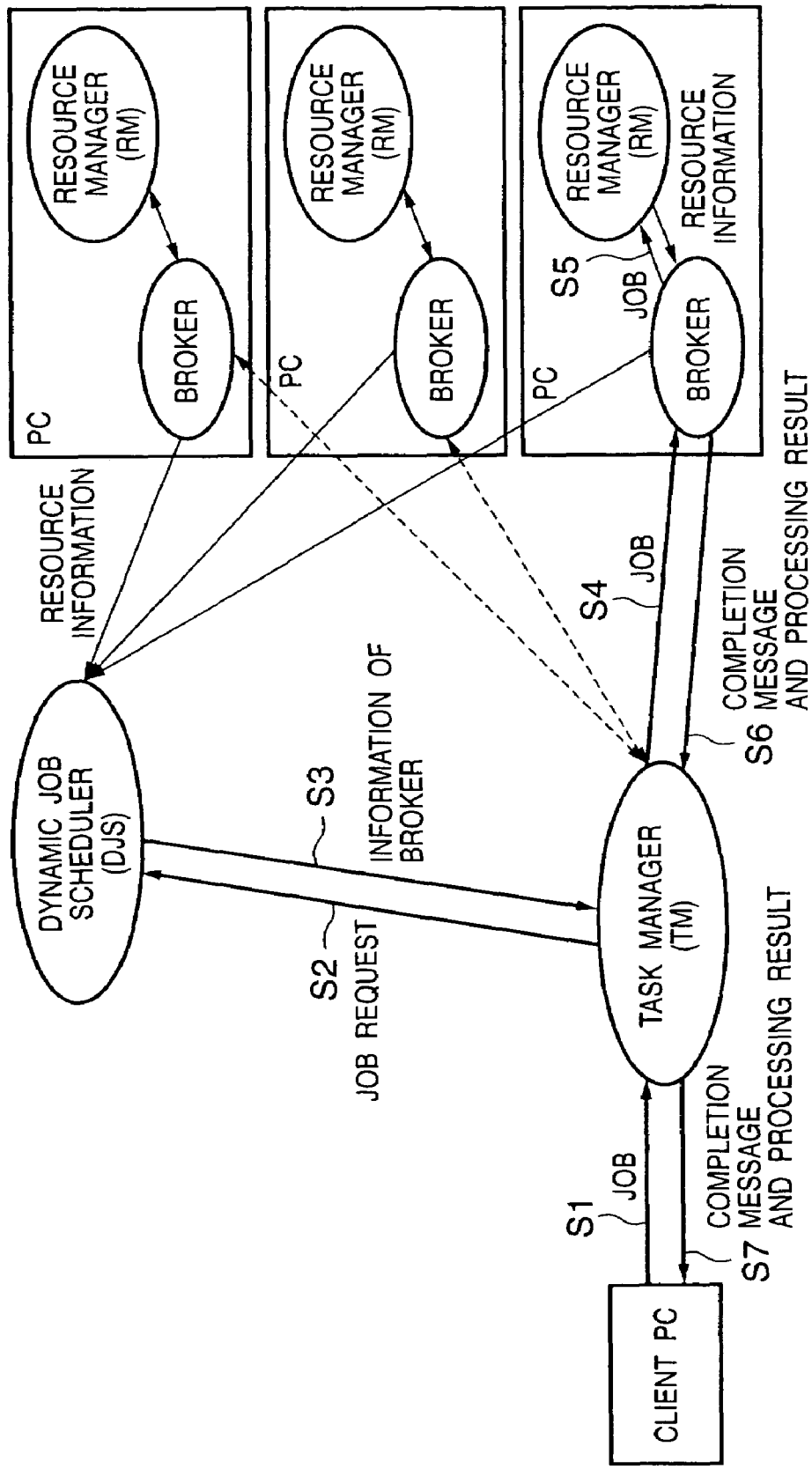
FIG. 1 is a diagram for explaining the architecture of grid computing.

FIG. 1 is a diagram for explaining the architecture of grid computing. There are several types of grids. A grid to be described below is of the type called a desktop grid, which executes a job by utilizing a free time of a CPU of a desktop PC or the like.

A client PC shown in FIG. 1 inputs a job in accordance with a user's instruction (S1). That request (job) is passed to a task manager (to be abbreviated as "TM" hereinafter), which informs a dynamic job scheduler (to be abbreviated as "DJS" hereinafter) of the contents (job request) (S2). The DJS which manages the resources of the overall grid computing system selects brokers of optimal resources and informs the TM of the selected brokers (S3). Note that the resource means an idle state of a CPU of a PC.

The broker in each PC registers, in the DJS, performance information indicating the processing performance of the PC resource, and resource information that includes information which is received by a resource manager (to be abbreviated as "RM" hereinafter) in the PC and indicates the idle state of the resource. Upon reception of a request from the TM, the broker inputs a job to the RM (S4), and notifies the TM of completion of the job (and the processing result (S5). The TM inputs jobs to the brokers selected by the DJS, and monitors the status of these jobs. Upon reception of a completion message (and processing result) from each broker (S6), the TM sends a completion message (and processing result) to the client PC (S7).

The RM notifies the broker of the resource information, and inputs a job to the resource in accordance with a broker's instruction. The RM periodically checks the status of the resource. If the RM finds a change or abnormality of the resource (e.g., a trouble, reception of another job, or the like), it advises the broker accordingly.

With this scheme, the implementation form of desktop grid computing is to allow distributed processing by distributing jobs to the resources of optimal CPUs (which are not used normally).

Note that the TM can acquire or refer to the performance information indicating the processing performance of the resource, and resource information indicating the idle state of the resource, which are to be kept track by the DJS, by accessing the DJS.

Figure 2:
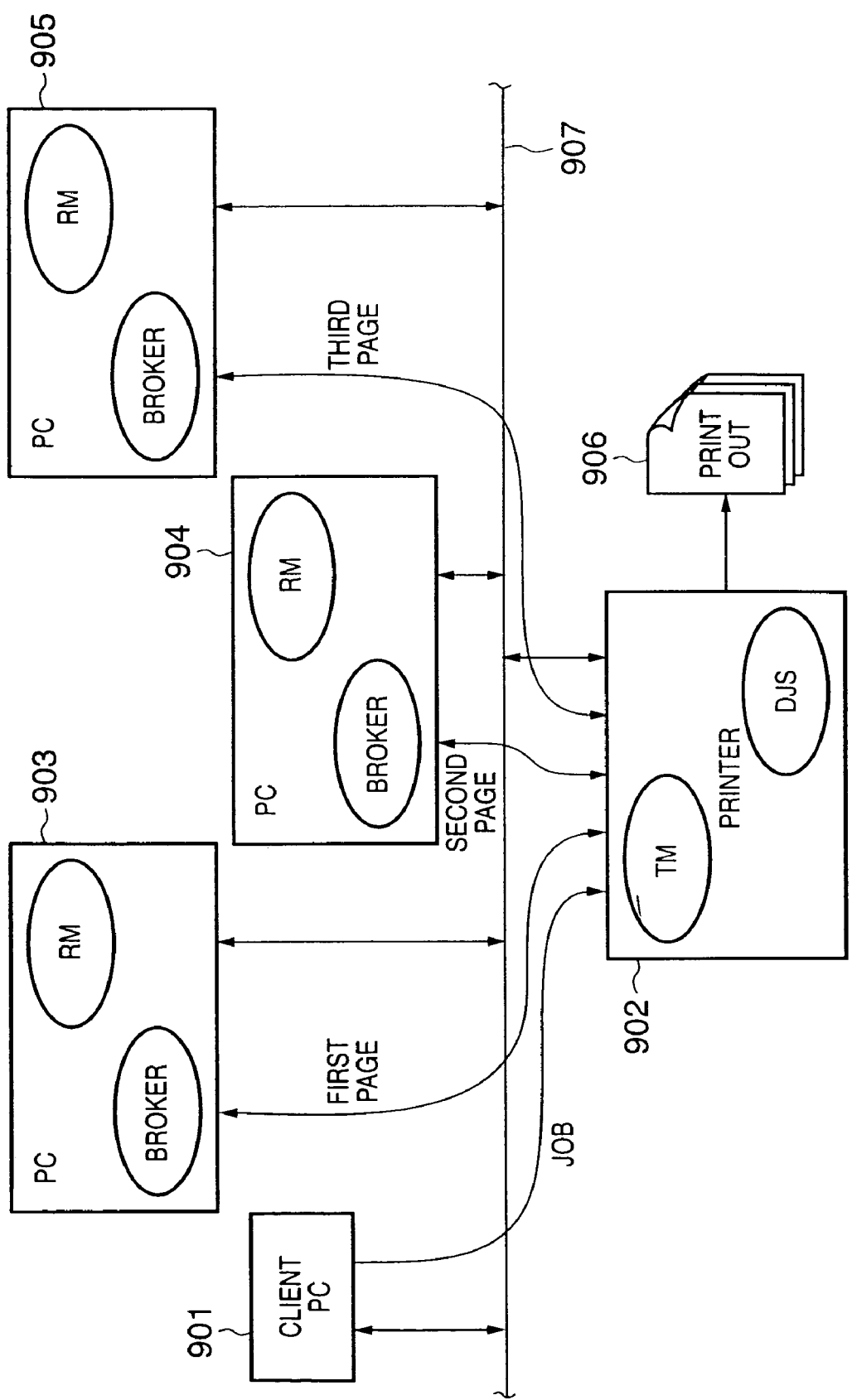
FIG. 2 is a diagram for explaining the arrangement when the technique of desktop grid computing is applied to printer description language (PDL) processing.

FIG. 2 is a diagram for explaining an example of the arrangement when the technique of desktop grid computing is applied to printer description language (PDL) processing. In the description of FIG. 1, modules which form the grid are handled as independent ones. However, when the technique of desktop grid computing is applied to a printer, a plurality of modules exist in a single device in general.

A client PC 901 in FIG. 2 issues a print instruction (inputs a print job) to a printer 902. The printer 902 has functions of the TM and DJS (i.e., it serves as a host machine of the distributed processing), and PCs 903 to 905 have functions of the broker and RM. This arrangement allows distributed processing based on grid computing using, e.g., three PCs connected to a network 907.

A job (print job of PDL format data) input from the client PC 901 is distributed to respective resources (e.g., the first page of that job to the PC 903, the second page to the PC 904, and the third page to the PC 905) by the TM and DJS of the printer 902 as the host machine, and these PCs execute rendering processes from the PDL data to image data. In this case, the printer 902 simultaneously transmits an application program for the rendering processing of PDL data to the respective resources. The printer 902 as the host machine collects images rendered based on the PDL data by the PCs (i.e., the processing results of images of the first to third pages), prints out images 906 for three pages, and notifies the client PC 901 of completion of the print job.

Of course, the target resources of this distributed processing may be four or more PCs, the resource on the client PC 901 as a job input source may be used, and other printer resources on the network 907 may be used.

As described above, when the distributed load system of grid computing is applied to computer devices such as printers, multi-functional peripheral equipment, and the like connected to a computer network, if a device that inputs a job which is received from a client and includes a large number of pages or requires a long processing time is executing another job (e.g., a print job received from a host computer), the distributed processing requires much time, and the client user cannot obtain the print result soon.

An embodiment that can implement high-speed distributed processing in accordance with the situation of a printing system (e.g., a target device of the distributed processing is executing another job (e.g., a print job received from a host computer)) by exploiting the framework of grid computing will be explained in detail hereinafter.

[Printer]

Figure 3:
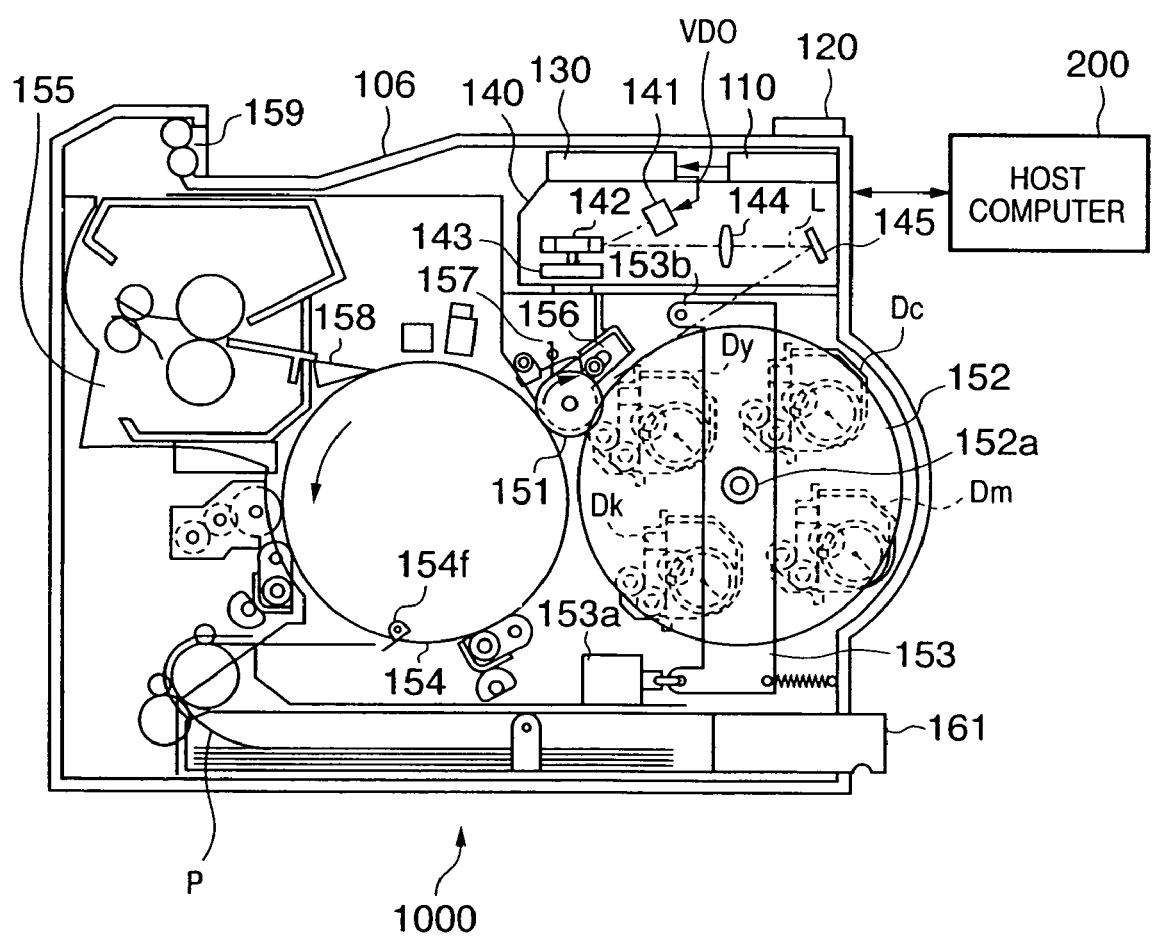
FIG. 3 is a sectional view showing the structure of a printer according to an embodiment of the present invention.

FIG. 3 shows the structure of a printer 1000 according to this embodiment. Note that this embodiment can be applied to a network environment to which a plurality of multi-functional peripheral equipments (MFPs), copying machines, and laser beam and ink-jet printers are connected. A color laser beam printer (to be simply referred to as a "printer" hereinafter) will be exemplified below as a typical printer. The printer 1000 shown in FIG. 3 prints an image at a recording density of 600 dpi on the basis of multi-valued data which expresses pixels of respective color components by 8-bit grayscale.

Referring to FIG. 3, the printer 1000 receives and stores a print command, which is supplied from an externally connected host computer 200 and includes print data (character codes, image data, PDL data, or the like) and a control code. The printer 1000 forms a character pattern, image, or the like in accordance with the received print command, and forms a color visible image on a print sheet. A formatter controller 110 interprets the print command supplied from the host computer 200 to generate a print image, and controls the overall printer 1000. The formatter controller 110 is connected to an operation panel 120 which receives a user's operation/instruction to inform the user of the status of the printer 1000. The operation panel 120 has switches, an LCD display, and the like, and is mounted as, e.g., a part of a housing of the printer 1000.

An output controller 130 reads out the final print image generated by the formatter controller 110 as a video signal VDO. The output controller 130 receives state signals from various sensors (not shown) arranged in respective units of the printer 1000, and outputs control signals to an optical unit 140 and various drive system mechanisms so as to control and execute print processing.

A print sheet P fed from a paper feed cassette 161 is held on the outer surface of a transfer drum 154 while its leading end is gripped by a gripper 154f. Electrostatic latent images of an image, which is color-separated into four colors, are formed on a photosensitive drum 151 in the order of yellow (Y), magenta (M), cyan (C), and black (Bk) by a laser beam output from the optical unit 140. The electrostatic latent image of each color is developed with toner by a corresponding developer Dy, Dm, Dc, or Dk in a developer selection mechanism 152. Toner images as the development results are overlaid and transferred onto the print sheet P on the transfer drum 154, thus forming a multi-color image on the print sheet P.

After that, the print sheet P is separated from the transfer drum 154, and is conveyed to a fixing unit 155. The print sheet P on which the toner images are fixed by heat and pressure by the fixing unit 155 is exhausted onto an exhaust tray 160 by an exhaust unit 159.

Note that the developers Dy, Dm, Dc, and Dk of respective colors have rotation support shafts at their two ends, and are held by the developer selection mechanism 152 to be rotatable about these shafts. With this mechanism, each developer can maintain its posture constant even when the developer selection mechanism 152 rotates about its rotation shaft 152a to select the developer, as shown in FIG. 3. After the selected developer moves to the developing position, a selection mechanism holding frame 153 having a fulcrum 153b is pulled by a solenoid 153a toward the photosensitive drum 151, and the developer selection mechanism 152 moves toward the photosensitive drum 151, thus performing the developing process.

The formatter controller 110 renders the print command to device-dependent bitmap data, and the output controller 130 reads out a video signal VDO corresponding to the bitmap data from the formatter controller 110. This video signal is input to a laser driver 141 to drive a semiconductor laser element. A laser beam L output from the semiconductor laser element is controlled to be turned on/off in accordance with the video signal VDO, and is reflected by a polygonal mirror 142, which is rotated at high speed by a scanner motor 143. The laser beam L then scans and exposes the surface of the photosensitive drum 151, which is uniformly charged to a predetermined polarity by a charger 156, via an f-θ lens 144 and reflecting mirror 145. As a result, an electrostatic latent image corresponding to the video signal VDO is formed on the photosensitive drum 151.

Next, an M electrostatic latent image is developed by the M developer Dm, and a first toner image of M is formed on the photosensitive drum 151. On the other hand, a print sheet P is fed from a paper feed cassette 161 at a predetermined timing. A transfer bias voltage having a polarity (e.g., plus polarity) opposite to toner is applied to the transfer drum 154 to electrostatically attract the print sheet P on the surface of the transfer drum 154, and the first toner image on the photosensitive drum 151 is transferred onto the print sheet P. After the toner image is transferred, residual toner on the photosensitive drum 151 is removed by a cleaner 157 to prepare for latent image formation and development of the next color.

In the same sequence, scan exposure of electrostatic latent images of the second, third, and fourth colors, and development and transfer of toner images are done in the order of C, Y, and Bk. Upon transferring the second, third, and fourth colors, a bias voltage higher than the previous formation is applied to the transfer drum 154.

When the leading end of the print sheet P on which the toner images of four colors have been overlaid and transferred approaches the separation position, a separation pawl 158 comes closer, and the leading end of the separation pawl 158 contacts the surface of the transfer drum 154 to separate the print sheet P from the transfer drum 154. The separated print sheet P is conveyed to the fixing unit 155 to fix the toner images on the print sheet, and is then exhausted onto the exhaust tray 160.

The printer 1000 outputs an image at a resolution of 600 dpi via the aforementioned image formation process. Note that a printer which can be used as that of this embodiment is not limited to the color laser beam printer. Alternatively, color printers of other schemes such as an ink-jet printer, thermal printer, and the like may be used, or a monochrome printer may be used.

[Printing System]

Figure 4:
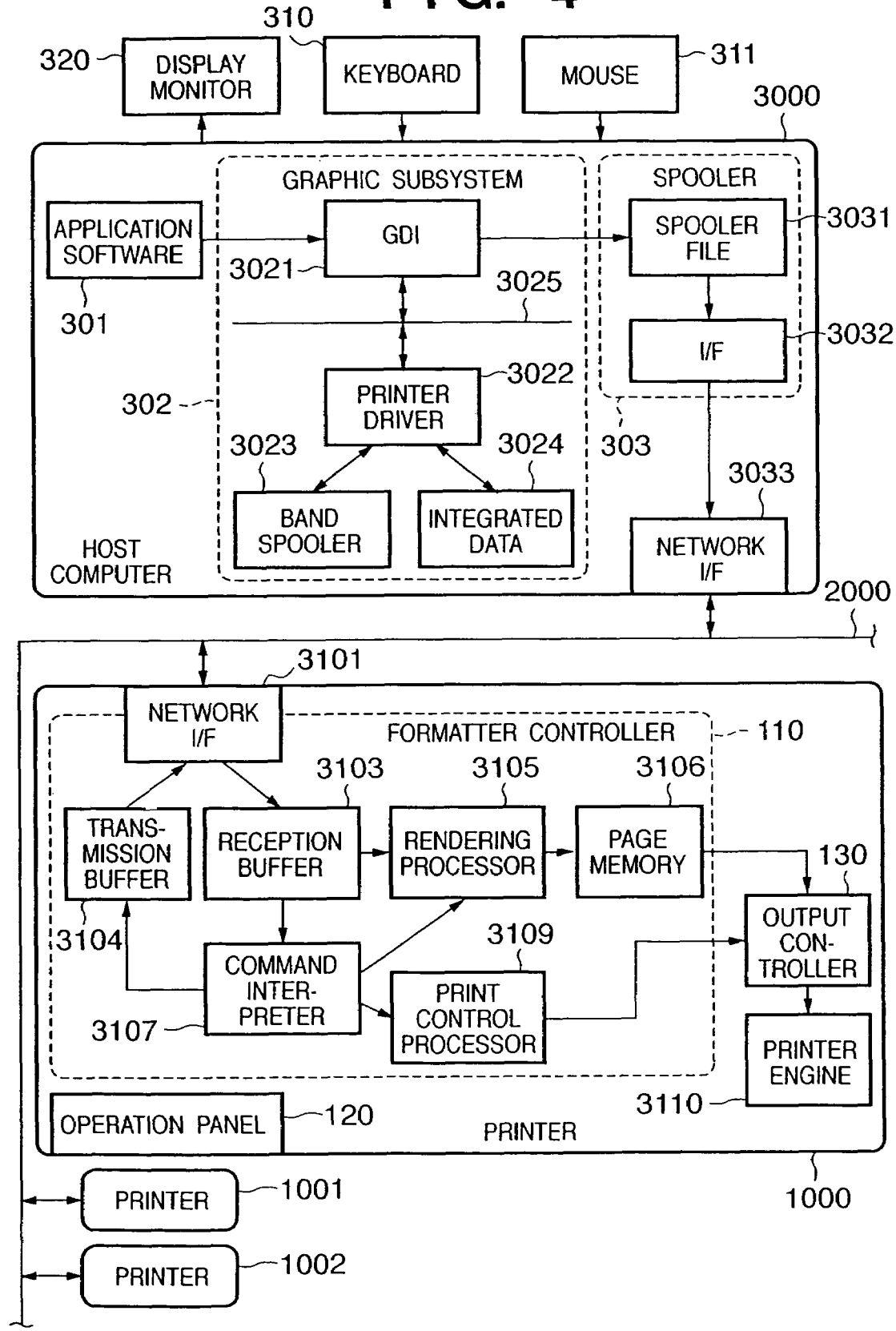
FIG. 4 is a block diagram showing the arrangement of a printing system according to the embodiment of the present invention.

FIG. 4 is a block diagram showing the arrangement of the printing system of this embodiment. The printing system has an arrangement in which a host computer 3000 and a plurality of printers 1000, 1001, 1002, . . . are connected to each other via a communication path 2000. Note that FIG. 4 illustrates three printers, but the number of printers are not limited.

Formatter Controller

The formatter controller 110 is also called a PDL controller or the like, and comprises a network interface (I/F) 3101 for making communications with the host computer 3000 or the like, a reception buffer 3103 for temporarily holding reception data and the like, a transmission buffer 3104 for temporarily holding transmission data and the like, a command interpreter 3107 for interpreting print data, a print control processor 3109 for executing print control processing, a rendering processor 3105 for executing rendering processing, a page memory 3106, and the like.

The network I/F 3101 exchanges print data with the host computer 3000 or the like. An arbitrary connection method between the host computer 3000 and printer may be adopted. For example, a connection via a computer network such as a Local area network (LAN) or the like, or a connection via a serial bus such as USB (Universal Serial Bus), IEEE1394, or the like may be used. Of course, infrared rays or radio may be used as the communication path 2000.

Print data received by the network I/F 3101 is sequentially stored in the reception buffer 3103, and is read out and processed by the command interpreter 3107 or rendering processor 3105 as needed. The command interpreter 3107 is implemented by a control program according to a print command system and print job control language. When a command pertains to text printing or rendering of a graphic, image, or the like, the command interpreter 3107 issues its processing instruction to the rendering processor 3105; when a command pertains to processing other than rendering such as a paper select command, reset command, or the like, it issues its processing instruction to the print control processor 3109.

The rendering processor 3105 is a YMCK renderer which sequentially renders respective rendering objects of characters and images on a band memory in the page memory 3106. In case of the color laser beam printer shown in FIG. 3, device-dependent bitmap data must be sent to a printer engine 3110 in the order of M, C, Y, and K. However, the memory capacity required for all these data is not always assured in a default state. That is, the rendering processor 3105 assures a memory area with a size of a fraction of one plane (1, 2, or 4 bits/pixel) as a band memory, and executes the rendering processing synchronized with the processing of the printer engine 3110 by repetitively using the band memory. Note that the printer engine 3110 is a generic name of the overall arrangement which includes the optical unit 140, photosensitive drum 151, developer selection mechanism 152, transfer drum 154, fixing unit 155, and the like shown in FIG. 3, and executes the aforementioned image formation process.

Normally, the page memory 3106 is managed by banding control in which shipping processing of a video signal to the printer engine 3110 pursues the rendering processing of the rendering processor 3105. However, if a sufficient memory capacity is available, a memory area on which bitmap data for one page can be mapped may be assured.

In general, the formatter controller 110 is implemented when a computer system that uses a central processing unit (CPU), read-only memory (ROM), random-access memory (RAM), and the like executes a control/processing program for a formatter controller. Processes of respective units in the formatter controller 110 may be processed by time sharing on the basis of a multi-task monitor (realtime OS), or dedicated controller hardware components may be prepared for respective functions to independently execute these processes.

The operation panel 120 receives user's operations/instructions and notifies the user of the status of the printer 1000, as described above. An output controller 3108 converts bitmap data mapped on the band memory (page memory) 3106 into a video signal, and transfers the video signal to the printer engine 3110. The printer engine forms a visible image on a print sheet on the basis of the received video signal.

Host Computer

The host computer 3000 outputs print data including print data and a control code to the printer 1000. The host computer 3000 is configured as one computer system to which a keyboard 310 and mouse 311 as input devices, and a display monitor 320 as a display device are connected. Note that the host computer 3000 is controlled by basic software (OS) such as Windows® or the like on the basis of hardware components such as a central processing unit (CPU), read-only memory (ROM), random-access memory (RAM), hard disk drive (HDD), various input/output controllers (I/Os), and the like, and respective application software programs and subsystem processes serve as function modules on the basis of that basic software.

Paying attention to only functions that pertain to this embodiment, the function modules of the host computer 3000 are classified into application software 301, a graphic subsystem 302, spooler 303, and network interface 3033 which communicates with the printer. The application software 301 is general application software such as a word-processor, spreadsheet, or the like, which runs on the OS and creates documents.

The graphic subsystem 302 comprises a Graphic Device Interface (to be abbreviated as "GDI" hereinafter) 3021 as a part of the functions of the OS, a printer driver 3022 as a device driver which is dynamically linked from the GDI 3021, and a band spooler 3023 and integrated data 3024 (both of which are stored on a predetermined area of the RAM). The printer driver 3022 is called from the GDI 3021 via a Device Driver Interface (to be abbreviated as "DDI" hereinafter) 3025, and executes processing depending on the printer for respective rendering objects. The host computer 3000 according to this embodiment includes two different types of processing: information passed to the DDI function is converted into a print command data (PDL) format that can be processed by the printer at high speed, and the converted data is directly output to the spooler 303; and generated print command data is divided into bands and is held on the band spooler 3023 for one page in turn from the first band, and the held band data are output to the spooler 303 together at the end of the page.

The spooler 303 is a spool file system managed by the OS. The spooler 303 stores print data for one page or job depending on settings as a spool file 3031 (its storage area is assigned to the HDD), and transmits the spool file to the printer via an I/F 3032 and the network I/F 3033.

The names of the aforementioned units and functional framework may be slightly different depending on the OS, but such differences of these names and framework do not influence the gist of this embodiment. For example, a module called a spooler or spool file in this embodiment can be implemented using a module called a print queue in another OS.

Processing of Printer Driver

Figure 5:
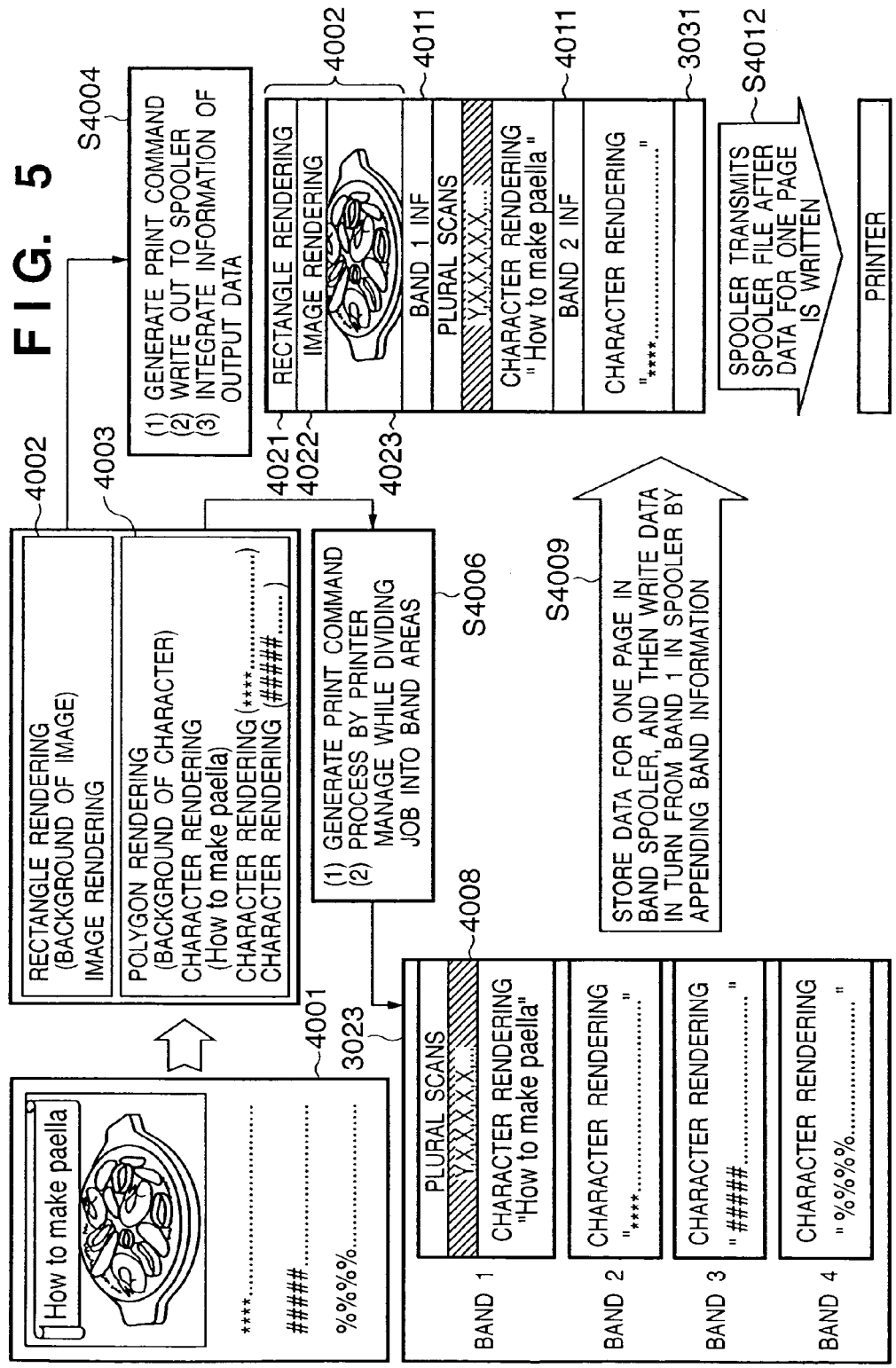
FIG. 5 is a chart illustrating an overview of processes of a printer driver.

FIG. 5 shows an overview of the processing of the printer driver 3022. Assume that a document 4001 created using a general document creation application includes graphics, text, and image data.

Upon printing the document 4001, rendering commands 4002 and 4003 are passed to the printer driver 3022 installed in the OS via the OS. In a default state, the printer driver 3022 generates print commands (PDL data) for respective rendering commands as in a normal PDL mode-based driver writes them in the spooler 303, and integrates the data sizes calculated by a predetermined calculation formula in accordance with the number and types of commands as integrated data 3024 (S4004). Note that the rendering commands (DDI functions) received by the printer driver 3022 via the OS are output in turn from lower layers of a stack of rendering objects. When all data for one page are written, the spooler 303 transmits the print commands (PDL data) stored as the spool file 3031 and the integrated data 3024 to the task manager, clears the spool file 3031, and instructs the printer driver 3023 to clear the integrated data 3024 (step S4012).

On the other hand, when the value of the integrated data 3024 exceeds a predetermined data size, the number of commands, or the like, the processing for each page is switched to that for respective bands, which will be described below. Assume that rendering objects up to "rectangle rendering (background of image)" 4021, "image rendering" 4022, and "entity of image (image data)" 4023 shown in FIG. 5 are stored in the spooler 303, and the processing for each page is switched to that for respective bands at the timing when the integrated data 3024 exceeds a threshold of the predetermined data size at the timing when the "entity of image" 4023 is output to the spooler 303.

Upon switching to the processing for respective bands at the above timing, the printer driver 3022 generates print commands for rendering commands 4003 after the "entity of image" 4023, and separately stores and manages the print commands in the band spooler 3023 in the rendering order for respective band areas to be processed by the printer (S4006). Since the rendering commands 4003 (DDI functions) passed from the OS are output irrespective of the print direction of the printer, even when the processing for respective bands is switched from the middle of a page, storage processing for all bands (first to N-th bands) in the page is done.

The storage processing is executed every time the DDI function in the printer driver 3022 is called. If the storage area assured for the processing for respective bands becomes full of data, a new area is assured on the RAM. Upon completion of storage of rendering data from the first to N-th bands, which correspond to the remaining data of one page, data are written out onto the spooler 3003 in the order of bands to be processed by the printer, and the band spooler 3023 is cleared (S4009).

Information (Band N inf) 4011 of next band data to be output is appended to the head of each band data, thus making the printer recognize that the print data is switched from the page unit to the band unit. When print data for one page is written, the spooler 303 transmits the spool file 3031 and integrated data 3024 to a task manager (to be described later), clears the spool file 3031, and instructs the printer driver 3022 to clear the integrated data 3024 (S4012).

Hardware Arrangement of Printer

Figure 6:
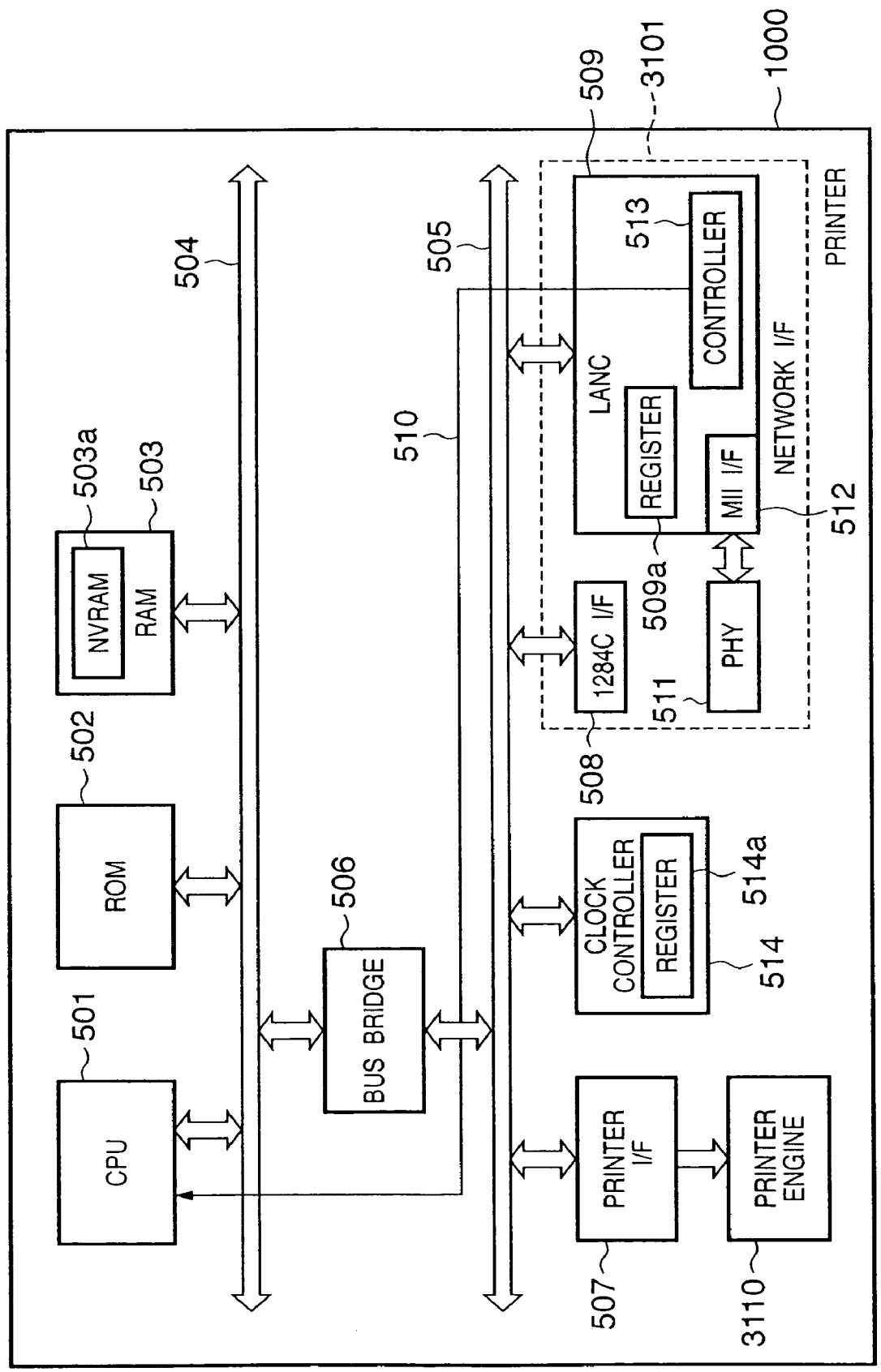
FIG. 6 is a block diagram showing the hardware arrangement of a printer.

FIG. 6 shows the hardware arrangement of the printer.

A CPU 501 of the printer executes control of the overall printer, arithmetic processing including an image process, and the like in accordance with control/processing programs stored in a ROM 502 using a RAM 503 as a work memory. The ROM 502 stores the control/processing programs and the like, and the CPU 501 operates by reading out and executing the programs from the ROM 502. The RAM 503 is used as the reception buffer 3103 and transmission buffer 3104 for temporarily storing reception/transmission data with the network 2000, the page memory 3106 for temporarily storing rendered image data, a work memory for temporarily saving data required for arithmetic operations of the CPU 501, and the like. By combining these CPU 501, ROM 502, and RAM 503, the formatter controller 110 and the like are implemented.

The CPU 501, ROM 502, and RAM 503 are connected to each other via a system bus 504, and are also connected to an extended bus 505 via a bus bridge 506. The system bus 504 and extended bus 505 are independently operable due to the presence of the bus bridge 506. A printer I/F 507 transfers image data stored in the RAM 503 and the like to the printer engine 3110.

The network I/F 3101 comprises an IEEE1284 I/F 508 as a Bicentronics interface, and a LANC 509. A PHY 511 is a physical transceiver used to connect the network 2000. An MII I/F 512 is an interface used to connect a LANC 509 to the PHY 511, and makes handshake data transfer with the PHY 511. An internal controller 513 of the LANC 509 performs control in the LANC 509 and control of external communications. The controller 513 can send an interrupt to the CPU 501 via a dedicated signal line 510, and can notify the CPU 501 of end of data transmission/reception with the network 2000. When a data packet is received from another device on the network 2000 and a specific bit pattern is detected from that data packet (to be referred to as "reception of a specific packet" hereinafter), the controller 513 sends to the CPU 501 an interrupt that advises accordingly. Note that the specific packet includes a magic packet® and a packet indicating start of distributed processing to be described later, and bit patterns of these packets are held in advance in the controller 513. Note that the bit pattern of the packet indicating start of distributed processing is set in advance between the host computer and printer. In this embodiment, the packet which has the specific bit pattern indicating start of distributed processing is called a "Grid packet".

A clock controller 514 distributes clocks to the respective modules via a clock supply line (not shown). The clock controller 514 can make the following control operations in accordance with the value of a register 514a which can be set by the CPU 501: stop of clocks to be supplied to some modules (to be referred to as "clock stop" hereinafter), cancel of clock stop, setting of clocks to be supplied to some modules lower than a normal operation state (to be referred to as "clock down" hereinafter), restoration of clocks to the frequency of the normal operation (to be referred to as "clock up" hereinafter), and the like.

Distributed Processing

Figure 7:
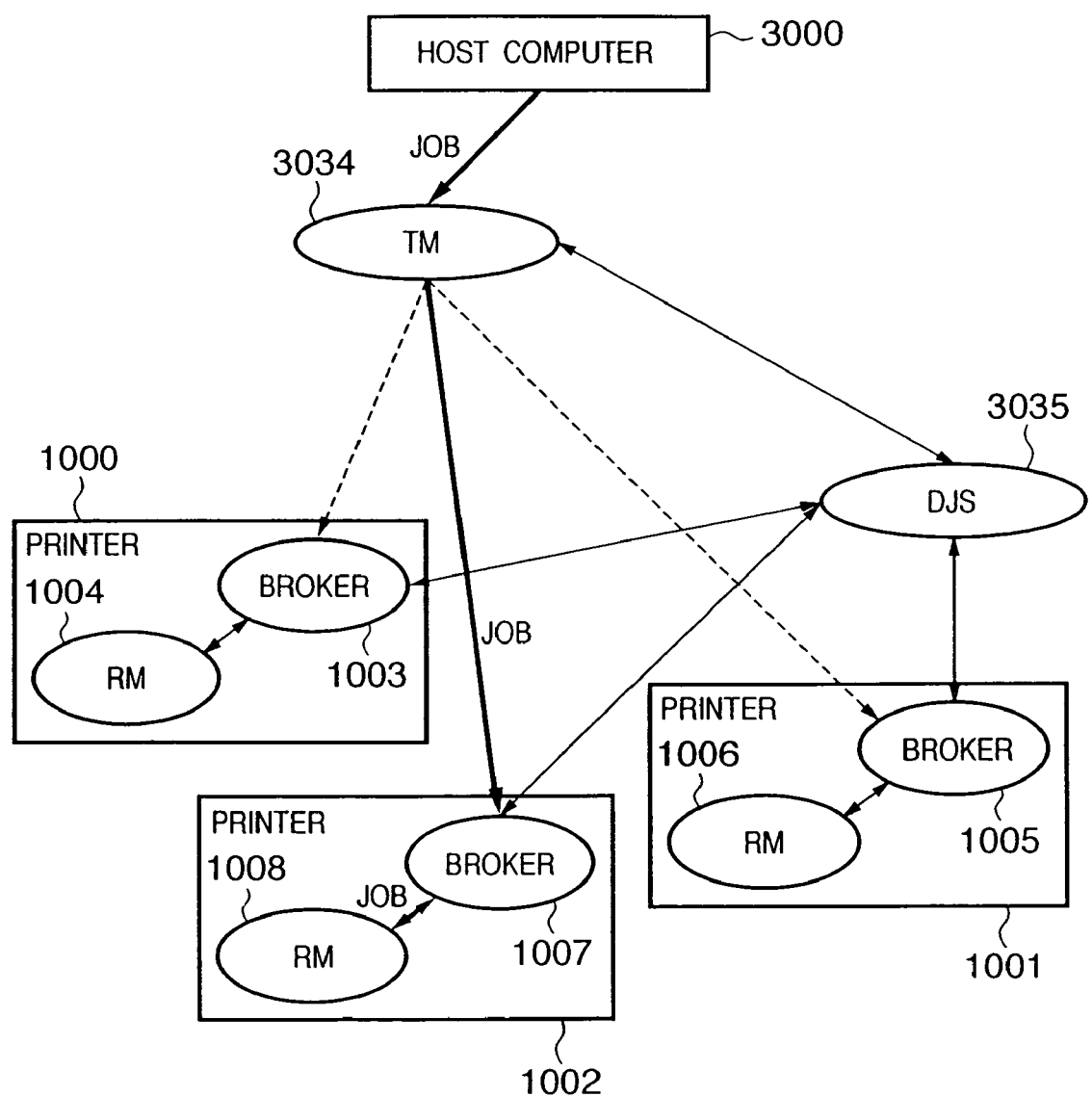
FIG. 7 is a chart for explaining the distributed processing of a printing system.

FIG. 7 is a chart for explaining the distributed processing of the printing system. In the following description, a task manager (TM) 3034 and dynamic job scheduler (DJS) 3035 are implemented by software installed on basic software which is executed by the CPU of the host computer 3000. Also, a broker and resource manager (RM) are implemented by software installed on basic software which is executed by the CPU of each printer.

The host computer 3000 starts a job. In this embodiment, the job means a print operation. Upon reception of the job, the TM 3034 sends a job request to the DJS 3035 so as to request it to interpret the job. Based on the interpretation result (including a message indicating an optimal broker or brokers) from the DJS 3035, the TM 3034 inputs the job to brokers 1003, 1005, and/or 1007 (FIG. 7 shows a state wherein the job is input to the broker 1007 of the printer 1002). Note that the DJS 3035 periodically inquires the status of each broker to keep track the situation of the resource (idle state of the printer) and that of the entire printing system, thus selecting an optimal broker or brokers.

The brokers 1003, 1005, and 1007 of the printers receive the idle states of the resources and the like from their RMs 1004, 1006, and 1008, and register them in the DJS 3035. When the TM 3034 inputs a job to each broker, the broker searches for an optimal resource, inputs the job to that resource via the RM, and sends a job completion message (and processing result) from the RM to the TM 3034. If the resource suffers any abnormality, each RM advises the broker of the same printer accordingly. Note that the abnormality corresponds to a case wherein a job is input from another client, and a job to be input or the input job from the TM 3034 cannot be continuously processed.

FIG. 8 is a flowchart showing the processing of the TM 3034.

The TM 3034 waits for input of a job (S1101). If a job is input, the TM 3034 estimates a processing time required for data processing (rendering and conversion into bitmap data) when that job is input to target devices of distributed processing, which are designated in advance, and a processing time when data processing is made by the printer designated by the job (S1102). A method of designating devices in advance is determined based on information acquired by the TM 3034 and DJS 3035. That is, the TM 3034 and DJS 3035 periodically inquire the brokers of RM status. The TM 3034 and DJS 3035 determine based on the inquiry result if respective devices are ready to execute distributed processing. The TM 3034 and DJS 3035 select devices which are ready to execute distributed processing from those which are registered in advance on the basis of the determination result, and designate the devices.

The processing time is estimated on the basis of the aforementioned integrated data 3024, and performance information of devices (resources) and resource information indicating the idle states, which are obtained from the DJS 3035, using:

$$Tp = V \times d / (C \times A) \quad (1)$$

where Tp: estimated processing time
V: processing data size (e.g., the value of integrated data)
d: division ratio ($0 < d \leq 1$)
C: the value indicated by performance information (larger as performance is higher)
A: the value indicated by resource information ($0 < A < 1$)
For A=1 for the printer designated by the job.
In case of N equal division, d=1/N, and in case of unequal division, d is determined by the division ratio.

The performance information of the printer designated by the job is acquired from that printer. Alternatively, the processing time may be estimated on the basis of the count value of number of times of calling of image-based commands upon converting the number of pages and rendering commands sent from the printer driver into PDL rendering commands. Processes may be input to a plurality of devices while being divided into those for bands or pages. If the processing time can be shortened when an arbitrary device executes all processes, the whole job may be input to that device.

The distributed processing method (including no distributed processing) and the division processing method, which can minimize the processing time, are determined on the basis of the estimated processing time (S1103). If the resource of the device designated in advance is executing another job and speeding up of the processing cannot executed even when the processing time can be shortened by the distributed processing, or if the job is relatively light and can be processed by the processing speed of the designated printer, the processing is done by the printer designated by the job. As the processing time to be estimated of data, the time required to receive the distributed processing results from the respective devices, the time required to combine the received distributed processing results, and the like are also taken into consideration.

It is checked if the distributed processing is performed (S1104). If the distributed processing is performed, processes divided from the job are input to the target devices of the distributed processing (S1105). Of course, divided processes may be distributed and input to a plurality of devices. If the processing time can be shortened when all processes are done by a given device, the whole job may be input to that device.

The processing results (image data which are rendered and converted into bitmap data in this case) returned from the devices to which the divided processes are input are combined (S1106), and the combined image is printed by the printer designated by the job (S1108), thus ending the job. Of course, when the whole job is input to a single device, the processing results need not be combined.

If the distributed processing is not performed (in other words, the job is processed by the printer designated by the job), the printer designated by the printer executes the processing (S1107) and prints an image (S1108), thus ending the job.

FIGS. 9A to 9C are tables for explaining determination of the distributed processing method and division processing method (S1103).

In FIGS. 9A to 9C, device A is a printer designated by the job, and devices B to D are target devices of distributed processing, which are designated in advance. FIGS. 9A to 9C show the processing times of other devices to have reference "1" when device A executes data processing of the job. Also, a "whole input" column indicates the processing times when the whole job is input, a "page division (equal)" column indicates the processing times when devices B to D execute division processes for 10 pages in case of a print job including, e.g., 30 pages, and "page division (unequal)" indicate the processing times when devices B, C, and D respectively execute division processes for 15 pages, 10 pages, and 5 pages in case of a print job including, e.g., 30 pages. The TM 3034 sets an unequal division ratio on the basis of the performance information of the devices (resources) held by the DJS 3035.

FIG. 9A shows a case wherein the resources of devices B to D are idle. In case of page division (equal), the distributed processing time is determined by the processing time of device D which has the lowest performance among the three devices, and is estimated to be "0.5". However, when the distributed processing is made by page division (unequal), the distributed processing time is estimated to be "0.3" as a minimum processing time. Therefore, based on the estimation result of FIG. 9A, the TM 3034 determines that the distributed processing is performed by page division (unequal) using devices B to D.

FIG. 9B shows a case wherein the resources of devices C and D are idle, but a load is imposed on device B and its idle resource is small. In this case, in case of page division (unequal), the distributed processing time is determined by the processing time of device B which has a small idle resource among the three devices, and is estimated to be "0.8". However, when the distributed processing is made by page division (equal), the distributed processing time is estimated to be "0.6". Therefore, if the estimation result of FIG. 9B is obtained, the TM 3034 determines that the distributed processing is performed by page division (equal) using devices B to D.

FIG. 9C shows a state wherein the load is imposed on not only device B but also device C. In this case, since all the distributed processing times exceed "1", the TM 3034 inputs the job to device A (the printer designated by the job). In other words, no distributed processing is performed.

Although not shown, the processing time may be shortened when the whole job is input to device B or the like. In such case, the TM 3034 inputs the whole job to device B.

In this way, the time required to process the job by the target devices of the distributed processing is estimated, and the distributed processing method and division processing method, which are predicted to minimize the processing time, are set. Therefore, when the distributed processing requires much time (e.g., a given target device of the distributed processing is executing another job (a print job received from the host computer)), higher-speed processing can be performed in accordance with the situation of the printing system by changing the division processing method, inputting a job to another device, and so forth. Hence, problems (e.g., the distributed processing requires much time and the user cannot obtain the print result soon) can be solved.

OTHER EMBODIMENT

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-171762, filed on Jun. 9, 2004, which is hereby incorporated by reference herein.

What is claimed is:

1. An information processing apparatus connected to a network, comprising:

an input section, arranged to input a print job;

an estimation section, arranged to estimate a first processing time when a plurality of information processing devices connected to the network execute distribute processing of data processes in the print job, and a second processing time when an information processing device designated by the print job executes the data processes;

a controller, arranged to transmit the print job to the information processing device designated by the print job, or to transmit jobs divided from the print job to the plurality of information processing devices connected to the network so as to execute the distribute processing, based on the estimation result; and a combiner, arranged to combine distribute processing results returned from the plurality of information processing devices, and to transmit the combined distribute processing results to the information processing device designated by the print job when the distribute processing has been executed.

2. The apparatus according to claim 1, further comprising a tracking section arranged to keep track of performance information and operation status of the information processing devices connected to the network, wherein said estimation section estimates the first and second processing times with reference to the amount of data to be processed, a division ratio, the performance information and operation status.

3. The apparatus according to claim 1, wherein the first processing time includes a time required to receive the distribute processing results and a time required to combine the distribute processing results.

4. The apparatus according to claim 1, wherein said controller executes the distribute processing when the first processing time is less than the second processing time.

5. A method of controlling an information processing apparatus connected to a network, comprising the steps of:
inputting a print job;
estimating a first processing time when a plurality of information processing devices connected to the network execute distribute processing of data processes in the print job, and a second processing time when an information processing device designated by the print job executes the data processes;
transmitting the print job to the information processing device designated by the print job, or transmitting jobs divided from the print job to the plurality of information processing devices connected to the network so as to execute the distribute processing, based on the estimation result; and
combining distribute processing results returned from the plurality of information processing devices, and transmitting the combined distribute processing results to the information processing device designated by the print job when the distribute processing has been executed.

6. An information processing apparatus connected to a network, comprising:
an input section, arranged to input a print job;
an estimation section, arranged to estimate a first processing time when a plurality of information processing devices connected to the network execute distribute processing of data processes in the print job, and a second processing time when an information processing device designated by the print job executes the data processes;
a controller, arranged to transmit the print job to the information processing device designated by the print job, or to transmit jobs divided from the print job and an application program for processing the divided job to the plurality of information processing devices connected to the network so as to execute the distribute processing, based on the estimation result; and
a combiner, arranged to combine distribute processing results returned from the plurality of information processing devices, and to transmit the combined distribute processing results to the information processing device designated by the print job when the distribute processing has been executed.

7. A method of controlling an information processing apparatus connected to a network, comprising the steps of:
inputting a print job;
estimating a first processing time when a plurality of information processing devices connected to the network execute distribute processing of data processes in the print job, and a second processing time when an information processing device designated by the print job executes the data processes;
transmitting the print job to the information processing device designated by the print job, or transmitting jobs divided from the print job and an application program for processing the divided job to the plurality of information processing devices connected to the network so as to execute the distribute processing, based on the estimation result; and
combining distribute processing results returned from the plurality of information processing devices, and transmitting the combined distribute processing results to the information processing device designated by the print job when the distribute processing has been executed.

8. A computer-executable program stored in a computer-readable medium comprising program code causing a computer to perform a method of controlling an information processing apparatus connected to a network, the method comprising the steps of:
inputting a print job;
estimating a first processing time when a plurality of information processing devices connected to the network execute distribute processing of data processes in the print job, and a second processing time when an information processing device designated by the print job executes the data processes;
transmitting the print job to the information processing devices designated by the print job, or transmitting jobs divided from the print job to the plurality of information processing devices connected to the network so as to execute the distribute processing, based on the estimation result; and
combining distribute processing results returned from the plurality of information processing devices, and transmitting the combined distribute processing results to the information processing device designated by the print job when the distribute processing has been executed.

9. A computer-readable storage medium storing a computer-executable program causing a computer to perform a method of controlling an information processing apparatus connected to a network, the method comprising the steps of:
inputting a print job;
estimating a first processing time when a plurality of information processing devices connected to the network execute distribute processing of data processes in the print job, and a second processing time when an information processing device designated by the print job executes the data processes;

transmitting the print job to the information processing device designated by the print job, or transmitting jobs divided from the print job to the plurality of information processing devices connected to the network so as to execute the distribute processing, based on the estimation result; and combining distribute processing results returned from the plurality of information processing devices, and transmitting the combined distribute processing results to the information processing device designated by the print job when the distribute processing has been executed.

10. A computer-executable program stored on a computer-readable medium comprising program code causing a computer to perform a method of controlling an information processing apparatus connected to a network, the method comprising the steps of:

inputting a print job;

estimating a first processing time when a plurality of information processing devices connected to the network execute distribute processing of data processes in the print job, and a second processing time when an information processing device designated by the print job executes the data processes;

transmitting the print job to the information processing device designated by the print job, or transmitting jobs divided from the print job and an application program for processing the divided job to the plurality of information processing devices connected to the network so as to execute the distribute processing, based on the estimation result; and combining distribute processing results returned from the plurality of information processing devices, and transmitting the combined distribute processing results to the information processing device designated by the print job when the distribute processing has been executed.

11. A computer-readable storage medium storing a computer-executable program causing a computer to perform a method of controlling an information processing apparatus connected to a network, the method comprising the steps of:

inputting a print job;

estimating a first processing time when a plurality of information processing devices connected to the network execute distribute processing of data processes in the print job, and a second processing time when an information processing device designated by the print job executes the data processes;

transmitting the print job to the information processing device designated by the print job, or transmitting jobs divided from the print job and an application program for processing the divided job to the plurality of information processing devices connected to the network so as to execute the distribute processing, based on the estimation result; and combining distribute processing results returned from the plurality of information processing devices, and transmitting the combined distribute processing results to the information processing device designated by the print job when the distribute processing has been executed.

* * * * *

UNITED STATES PATENT AND TRADEMARK OFFICE
CERTIFICATE OF CORRECTION

PATENT NO. : 7,382,484 B2  Page 1 of 1
APPLICATION NO. : 11/148298
DATED : June 3, 2008
INVENTOR(S) : Matsukubo et al.

It is certified that error appears in the above-identified patent and that said Letters Patent is hereby corrected as shown below:

TITLE PAGE: (75) Inventors:
"Yushi Matsukubo, Kanagawa-ken (JP);
Yukihiko Shimizu, Chiba-ken (JP);
Masataka Yasuda, Kanagawa-ken (JP);
Noriyuki Kobayashi, Kanagawa-ken (JP);
Shinichiro Maekawa, Kanagawa-ken (JP);
Takeshi Namikata, Kanagawa-ken (JP);
Hideki Sakai, Chiba-ken (JP);
Hirohiko Tashiro, Kanagawa-ken (JP);
Atsushi Matsumoro, Tokyo (JP);
Masamichi Akashi, Chiba-ken (JP)" should read -- Yushi Matsukubo, Yokohama (JP);
Yukihiko Shimizu, Urayasu (JP);
Masataka Yasuda, Kawaski (JP);
Noriyuki Kobayashi, Kawaski (JP);
Shinichiro Maekawa, Kawasaki (JP);
Takeshi Namikata, Yokohama (JP);
Hideki Sakai, Sakura (JP);
Hirohiko Tashiro, Kawasaki (JP);
Atsushi Matsumoro, Tokyo (JP);
Masamichi Akashi, Funabashi (JP) --.

Signed and Sealed this

Sixth Day of January, 2009

JON W. DUDAS
*Director of the United States Patent and Trademark Office*